(12) United States Patent
Beikirch et al.

(10) Patent No.: US 7,587,088 B2
(45) Date of Patent: Sep. 8, 2009

(54) METHOD AND APPARATUS FOR IMAGE PROCESSING

(75) Inventors: Lars Beikirch, Pirna (DE); Joachim Ihlefeld, Dresden (DE); Oliver Vietze, Frauenfeld (CH)

(73) Assignee: Baumer Optronic GmbH, Radeberg (DE)

( * ) Notice: Subject to any disclaimer, the term of this patent is extended or adjusted under 35 U.S.C. 154(b) by 713 days.

(21) Appl. No.: 11/410,319

(22) Filed: Apr. 24, 2006

(65) Prior Publication Data

US 2007/0248269 A1    Oct. 25, 2007

(51) Int. Cl.
*G06K 9/46* (2006.01)
(52) U.S. Cl. .................. 382/201; 382/203; 382/199; 382/173

(58) Field of Classification Search ................ 382/203, 382/201, 100, 173, 199, 271, 272, 273, 274; 380/18, 54; 257/678; 283/72, 73; 713/176; 358/464, 467, 520, 522
See application file for complete search history.

(56) References Cited

U.S. PATENT DOCUMENTS 5,751,854 A * 5/1998 Saitoh et al. ................ 382/218
6,212,285 B1 * 4/2001 Bender et al. ............... 382/100
6,272,248 B1 * 8/2001 Saitoh et al. ................ 382/218

* cited by examiner

*Primary Examiner*—Anh Hong Do
(74) *Attorney, Agent, or Firm*—Ohlandt, Greeley, Ruggiero & Perle, L.L.P.

(57) ABSTRACT

The methods and apparatuses determine contour points from image data and carried out a segmentation process on the basis of the contour points, during which associated contour points are combined to form objects for further processing.

34 Claims, 12 Drawing Sheets

Figure 1:
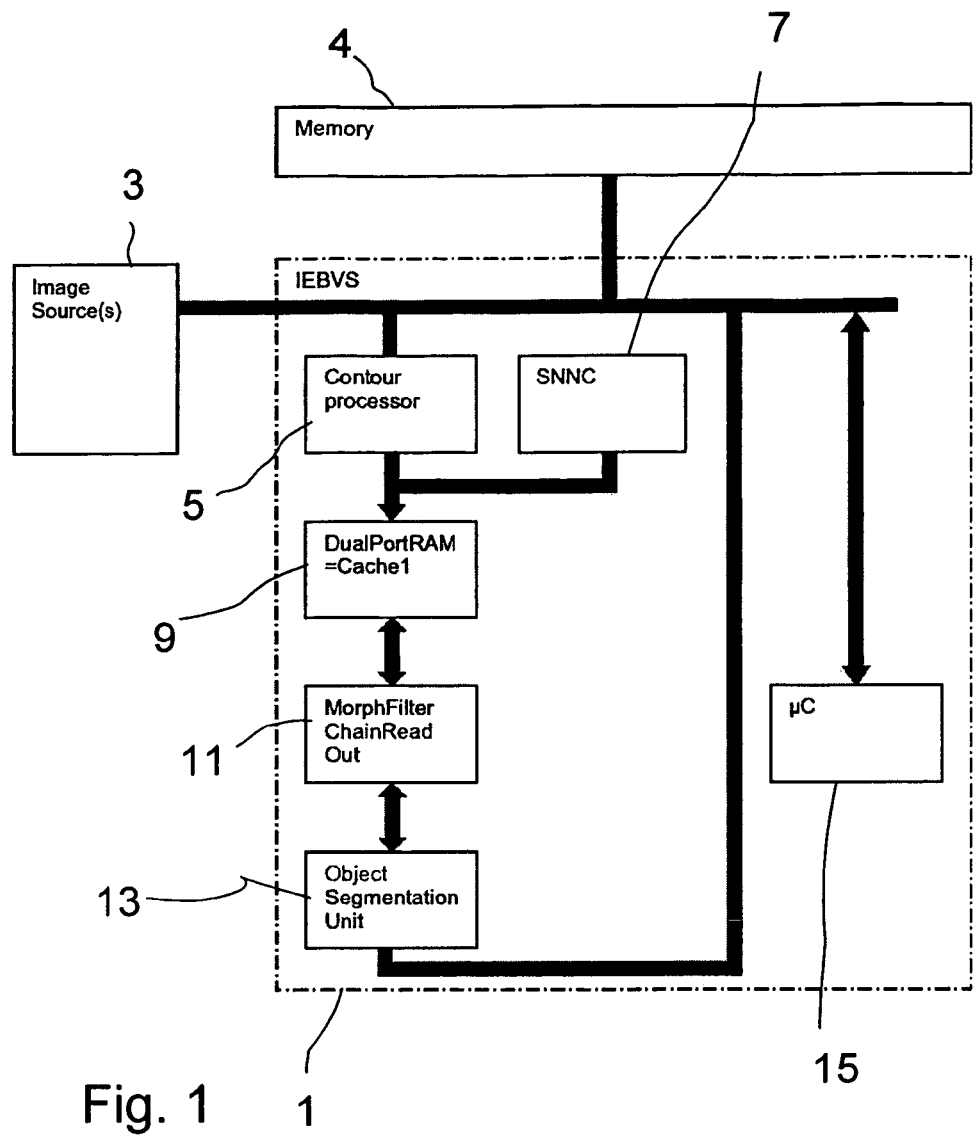

| 23 | 24 | 2 | 3 | 5 |
|----|----|----|----|----|
| 21 | 22 | 1 | 4 | 6 |
| 20 | 19 | CP | 7 | 8 |
| 18 | 16 | 13 | 10 | 9 |
| 17 | 15 | 14 | 12 | 11 |

Fig. 9A

| Field | X | Y |
|---|---|---|
| CP | 244 | 344 |
| 7 | 249 | 342 |
| 9 | 251 | 339 |
| 13 | 245 | 341 |
| 18 | 237 | 341 |
| 19 | 241 | 342 |
| 22 | 240 | 348 |
| 24 | 239 | 351 |

Fig. 9B

| Xrel | Yrel | ρ | X_Poly | Y_Poly | ρ |
|---|---|---|---|---|---|
| 0 | 0 | 0 |  |  | 0 |
| 5 | -2 | 5,385 | 2 | -3 | 3,606 |
| 7 | -5 | 8,602 | -6 | 2 | 6,325 |
| 1 | -3 | 3,162 | -8 | 0 | 8 |
| -7 | -3 | 7,616 | 4 | 1 | 4,123 |
| -3 | -2 | 3,606 | -1 | 6 | 6,083 |
| -4 | 4 | 5,657 | -1 | 3 | 3,162 |
| -5 | -7 | 8,602 | 5 | -7 | 8,602 |

Fig. 9C

| Xrel | Yrel | ρ | X_Poly | Y_Poly | ρ |
|---|---|---|---|---|---|
| -5 | -2 | 5,385 | -4 | -1 | 4,123 |
| 1 | -3 | 3,162 | -4 | 1 | 4,123 |
| -3 | -2 | 3,606 | -1 | 6 | 6,083 |
| -4 | 4 | 5,657 | -9 | 6 | 10,82 |

Fig. 13

| Bit | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|
| LINK Info | MASK | | | | 0 | | | | LINK3 | | | | | | | LINK2 | | | | | | | LINK1 | | | | | | | LINK0 | | | | | | |
| Atribute | DIR | Contrast | | | | | | | Colour Info | | | | | | | | | | | | Y-coordinate | | | | | | | | X-coordinate | | | | | | |

Fig. 15

| Bit | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|
| LINK Info | MASK | | | | MASK | | | C | 1 | S | LinkAdr[0..2] | | | LINK2 | | | | | | | | | LINK1 | | | | | | | LINK0 | | | | | | |
| Atribute | DIR | Contrast | | | | | | | | | Colour Info | | | | | | | | | | | | Y-coordinate | | | | | | | X-coordinate | | | | | |

Fig. 16

| Bit | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|
| LINK Info | MASK | | | | MASK | | | CONN33 | | | LINK3 | | | LINK2 | | | | | | | | | LINK1 | | | | | | | LINK0 | | | | | | |
| Atribute | DIR | Contrast | | | | | | | | | Colour Info | | | | | | | | | | | | Y-coordinate | | | | | | | X-coordinate | | | | | |

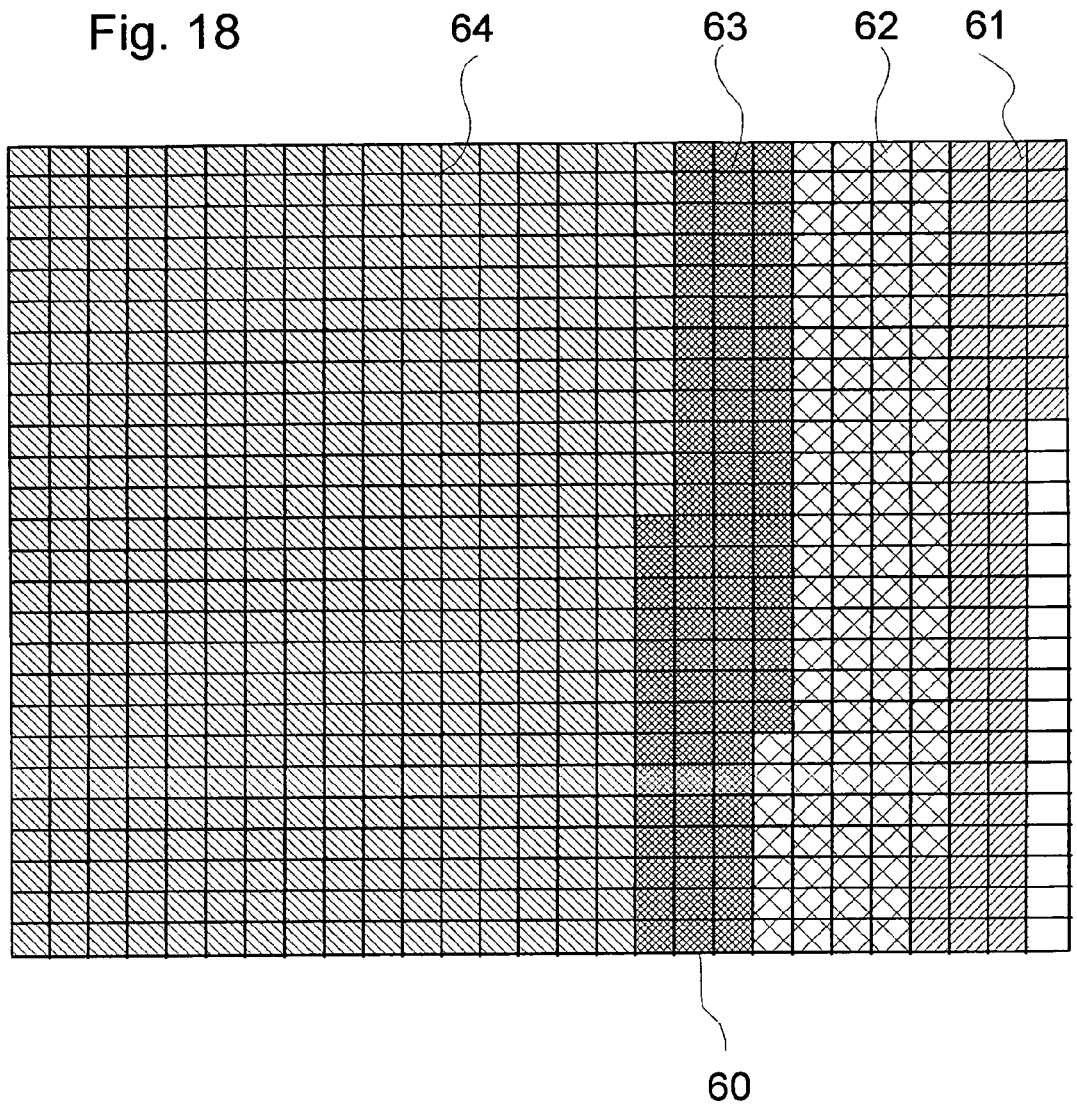

METHOD AND APPARATUS FOR IMAGE PROCESSING

BACKGROUND OF THE INVENTION

1. Field of the Invention

The invention relates in general to apparatuses and methods for image processing. In particular, the invention relates to a method and an apparatus for image processing in which contour points are determined from the image data and a segmentation process is carried out on the basis of the contour points, during which associated contour points are combined to form objects for further processing.

2. Description of Related Art

Nowadays, image processing systems are used in order to achieve automatic object identification for widely different technical applications. By way of example, industrial robots are frequently oriented on the basis of processed image data, allowing a robot to identify an object and its orientation and position. In order to ensure reliable identification of objects, a large amount of "a priori" knowledge about the object to be identified has, however, been required until now. This often involves the creation of specifically tailor-made software solutions for the respective technical field of operation. A procedure such as this is obviously highly complex and correspondingly expensive. In addition, technical implementation in this case often also includes tedious learning processes, by means of which the system is trained to identify selected objects.

A further problem is that memory-intensive and complicated calculations are required for image identification. Real-time identification is therefore virtually impossible to achieve in this way.

BRIEF SUMMARY OF THE INVENTION

The invention is therefore based on the object of providing a technical solution by means of which image identification can be carried out in real time and which is able to carry out appropriate and reliable identification of objects with only a very small amount of a-priori information, or even none at all. This object has already been achieved in a very highly surprisingly simple manner by an apparatus and a method as specified herein.

The invention accordingly provides a preferably integrated image processing apparatus having one or more image memories and at least one integrated hardware unit, which is designed to scan the data of a digital image stored in the image memory, to determine contour points with subpixel accuracy and to store this as continuous list data in a memory, and with the image processing apparatus also having a computation unit which is designed to use a computation mechanism to determine from the list data which is stored in the memory the connection probabilities between in each case two contour points taking into account the distance between the points. Furthermore at least one computation unit, subsequently referred to as a classifier is provided, which classifier uses sets of calculated connection probabilities to select subsets with at least three connection probabilities for possible links between at least three adjacent contour points, one of which is a previously defined central contour point, and to sort out for each subset that contour point which is adjacent to the central contour point and has a possible link with the lowest connection probability to an adjacent contour point, provided that the link does not connect two points which are adjacent to the central point and, following this, enters those contour points which have not been sorted out in a contour point list, with connectors which identify the remaining links to the central point.

The invention also provides a method for determination of associated contours in image data, which is carried out in particular in an image processing apparatus as described above, in which contour points are determined from the image data and the connection probabilities of possible links from contour points to adjacent contour points are calculated, and with one or more subsets from a set of such connection probabilities and with at least three connection probabilities being analyzed for possible links between at least two contour points and an adjacent selected central contour point, and with that contour point in each case being sorted out which is adjacent to the central contour point and has a possible link with the lowest connection probability to one of the other points, provided that the link does not connect two points which are adjacent to the central point, and, once this analysis of the subsets has been completed, enters contour point data in a list in an electronic memory, with this contour point data comprising connectors which identify links to the central point which belong to one contour. These connectors can then be processed further by using the connectors to combine the contour points to form contour segments which are used for object processing and object identification.

For the purposes of the invention, the expression adjacent contour points does not for example mean contour points relating to directly mutually adjacent pixels but in fact all contour points within a predetermined area surrounding the central point. By way of example, this may be a 5×5 surrounding area with the respective central point under consideration at its center. This set of contour points is then also referred to as the neighborhood.

The determination of the position of contour points with subpixel accuracy for one pixel is in this case carried out by calculation from the position of that pixel and further surrounding pixels.

The selection process according to the invention, in which contour points which have the lowest connection probability to the central point are in each case sorted out from a set, offers the advantage of requiring very little memory. In particular, the processing can be carried out on the basis of continuous list data. The small amount of memory which is required for this purpose even allows processing in real time, with little complexity in terms of the hardware to be used. Furthermore, because of their simplicity, the processes described above can easily be implemented in hardware modules without complex software and peripheral circuitry. The apparatus according to the invention can thus be designed in a very simple form as a very compact integrated hardware image processing apparatus. In order to reduce the amount of memory required, further processing of the contour points in the form of continuous list data is, in particular, also particularly advantageous. This list data preferably includes only the pixel coordinates of relevant contour points as well as attributes for the surrounding area, and therefore only that data which is relevant for contour identification. The amount of data is in this way accordingly reduced to a minimum in comparison to the original data of the image. The aim of the sorting-out process is to determine those contour points which, together with the respective central point under consideration, belong to the same contour.

The step of selection of contour points for further processing by sorting out contour points with the lowest connection probability to the central point can also be illustrated as follows: the set of contour points (=neighborhood candidates) which are grouped around a central point can be illustrated figuratively on a plane by representing the connection probabilities between contour points by paths, with the length of a path being indirectly proportional to the connection probability. Polygons are now formed which contain the central point and at least two further contour points adjacent to the central point as corner points. Those points which are adjacent to the central point and for which the longest link to a further point on the polygon originate are then removed. Depending on the number of adjacent contour points, this method can then be repeated for all the contour points which are adjacent to the central point, up to a certain number of contour points, with only two points including the central point also remaining in some circumstances depending on the arrangement of the points, and no more polygons can be formed in which further deletions of elements take place.

This selection process of the classifier can be carried out particularly effectively with a small number of computation operations and with little hardware complexity when one subset from the set of the contour points in the vicinity of the central point or of the contour points which are adjacent to the central point is in each case formed as a triple with the central point and two further contour points with the associated connection probabilities, and the lowest probability is determined, preferably by three comparators, for the connection probabilities and with that contour point which is adjacent to the central point and from which the link with the lowest connection probability within the triple originates being in each case sorted out from a neighborhood set of the contour points which are adjacent to the central point, provided that the associated link does not connect two contour points which are adjacent to the central contour point.

The connectors which the classifier leaves in the neighborhood after the sorting-out process are entered in a contour point list, and can then contain the indexes of adjacent contour points and the connection probabilities to adjacent contour points as well as further neighborhood information (direction DIR, contrast cont, color).

If the contour points are once again considered as being arranged on a plane with coordinates modified by the connection probabilities, then this procedure corresponds to the formation of triples of contour points, whose links accordingly form a triangle. Only the longest side in this triangle is determined and that contour point which is adjacent to the central point and from which the longest side originates is deleted.

The sorting-out process or the selection of the remaining contour points is preferably repeated at least once for the set of contour points which have not been sorted out. The image processing apparatus, in particular the classifier, which in each case sorts out the link with the lowest connection probability from at least three elements for links from at least two contour points to a selected central contour point may, in particular, be designed to repeat the selection process, in which contour points with possible links with the lowest connection probability are sorted out for each selected central contour point, until no further contour points which are adjacent to the central contour point can be deleted or sorted out.

If, as is particularly preferable, triples of contour points, or associated connection probabilities for possible links, are in each case formed and a suitable reading sequence for the contour points is considered, in which the subsets are formed such that only closest neighbors of contour points or the connection probabilities between these points are included, it has in general been found that it is sufficient to repeat the sorting-out process once and only once for all the triples of connection probabilities for possible links between closest adjacent contour points in order, at least in most cases, to sort out all of those contour points which do not belong to the same contour as the respective central point under consideration.

In some circumstances, ambiguities may occur in the selection of contour points by sorting out contour points with a low connection probability and, for example in the case of a triple of contour points, these lead to the classifier for the connection probabilities not sorting out any contour points even though the respectively longest links, or the lowest connection probabilities, in each case exist for links to the central point. This is the situation in particular when the points with coordinates which have been modified by the connection probabilities form an isosceles triangle or even an equilateral triangle. In this case, all of the contour points could admittedly be transferred, but it has surprisingly been found that a considerably better neighborhood definition, reduced by artifacts, is produced when modulation is applied to the connection probability, with this modulation corresponding to a position shift of contour points which is less than the pixel interval.

The data for the connection probabilities is admittedly changed during this process, and this can also lead to incorrect path decisions relating to contour points which actually belong to a cohesive contour, but it has been found that this has no damaging effect since possible incorrect decisions are neutralized on average. One simple, preferred implementation of modulation is in this case to change the pixel coordinates of contour points. However, it would also likewise be possible to calculate the connection probabilities within the classifier and then to apply modulation to these connection probabilities.

In the simplest case, connection probabilities of contour points can be determined on the basis of the distance between these points. The greater the distance between two contour points, the less is their connection probability. However, it is preferable to detect further attributes of the contour points and to also include them in the calculation of the connection probability.

In this case, it has been found to be particularly advantageous for the computation mechanism to calculate connection probabilities between contour points on the basis of the distance between the contour points and at least one of the attributes contrast, color and direction. For this purpose, one development of the invention provides for the computation unit, which is designed to determine the connection probabilities between contour points from the list which is stored in the memory to calculate the connection probabilities between contour points on the basis of the distance between the contour points and at least one of the attributes contrast, color and direction. By way of example, one possibility is to use one or more attributes to calculate the value of a function of the values of this attribute or these attributes, and to calculate a connection probability only when the value of the function is greater than or less than a threshold value, depending on the nature of the function.

In this case, by way of example, an attribute may be the mean point direction which is output from the contour point processor (the maximum gray-scale contrast lies in a scanning direction). The mean point direction is defined as the sum of the direction vectors of both contour points which belong to one connector and, to a good approximation, is generally at right angles to the direction of the connector itself. If two contour points have a similar contour direction, the connection probability accordingly rises, that is to say the probability of the two points actually belonging to a common contour. A further feature is the angle between the mean point direction and the direction of the connector. This angle can be calculated in a particularly simple manner by means of the scalar product of the two vectors, and can be included in the connection probability.

In particular, the contrast may be the brightness difference of areas which are adjacent to the contour point and are separated by the contour line. If two contour points have a similar contrast such as this, the probability of the two contour points being located on a common contour line accordingly rises. If the contrast is inverse, then this generally relates to a thin line whose contours which generally run parallel at a short distance apart should not be linked, that is to say the connection probability is in this case set to zero.

According to this embodiment of the invention, the integrated computation unit which is designed to scan the data of a digital image stored in the image memory, to determine contour points with subpixel accuracy and to store this as continuous list data in a memory, can thus be designed to calculate at least one further attribute of a contour point in addition to the position of that contour point, and to store this in the continuous list data. An attribute vector with a length of at least 24 bits, preferably with a length of at least 36 bits, is preferably produced by means of the integrated computation unit for a contour point, and is stored in the continuous list data. The computation unit, which is designed to determine the connection probabilities between contour points from the list data which is stored in the memory can then calculate connection probabilities between contour points on the basis of the distance between the contour points and at least one further attribute.

In order to allow the image data to be processed quickly with only a small amount of memory being required, in particular in order to determine contour points and connectors from the image data, it is also preferable for the image data to be read in a plurality of strips, which each have a width of more than 1 pixel, preferably at least 16 pixels, and particularly preferably 26 or 32 pixels. In this case, the image data is preferably read successively in strips which overlap by more than one pixel, preferably by at least 4 pixels, and particularly preferably by at least 8 pixels. This overlap will admittedly result in connectors in the overlap area being calculated twice in some circumstances, but this additional complexity is more than compensated for by the fact that the individual determined contours can be composed again more easily and with fewer errors.

The image processing apparatus is furthermore preferably designed for real-time image processing. This means that objects which the contours describe are determined completely within the image transfer. In particular, this real-time processing is also made possible by the very simple calculation of the connectors for the contour points.

In order to allow real-time processing such as this, it is also particularly preferable for the apparatus to have a dual-port RAM memory and a device for simultaneous storage and reading of list data from the dual-port RAM memory. This memory not only allows very short access times but also in particular allows the various processes for image processing to also access the data in the same memory at the same time. While a first process is writing list data to the memory, another process can at the same time read list data from the memory again. However, memories such as these, for example on an FPGA, are in general very small. Memories in the region of 4 kBytes are typically available. In this case, only the processing of list data instead of the mapping of entire images or image areas in the memory allows the restriction to memories which are as small as this.

A morphology filter is preferably provided as a process following the formation of list data with the connectors. The expression morphology filter is in this case used to characterize the smoothing effect of the filter operation, although topological characteristics are also used in this boundary area.

According to this embodiment of the invention, the image processing apparatus thus has a morphology filter computation device which is designed to filter the contour point list with connectors with respect to at least one of the following characteristics:
  contour points relating to chains of at most three contour points are deleted,
  contour points which belong only to a chain which is linked to a longer chain at one end and has at most three contour points are deleted,
  contour points which form start and end points of chains of associated contour points are identified in the contour point list,
  contour points which form branching points of at least two chains are identified in the contour point list.

In order to simplify the linking of connectors to form object segments, according to another development of the invention, a device for production of ranking vectors for contour points is also provided, which reads the contour point list with a connector structure and in each case reads the connector structure of all adjacent points starting from a central point via the connectors and produces a ranking vector which includes the number of branches of the adjacent points and of the central point itself. In this case, the connector structure is scanned with a time delay in order to enter connectors in the contour point list. The time delay is provided in order to ensure that the relevant dual-port RAM already contains data in which not only has the list data with the connectors been entered, but which is also read in order to form ranking vectors. The ranking vector is then mapped via a table or Boolean functions onto a preferably scalar potential function, and artifacts are sorted out by means of the potential function. In order to simplify the subsequent segmentation, a device can be provided for reading the contour point list in an organized sequence as an organized sequence of contour points, with successive list entries belonging to successive contour points along a contour. This device can determine associated contour points in particular on the basis of the respective connectors which are stored in the contour point list.

It has been found that low-artifact determination of links between contour points operates even with a small area surrounding a selected central contour point. Links between contour points can thus be determined reliably when connection probabilities for possible links of contour points are in each case calculated only for those further contour points including the central contour point which are a maximum distance of 2 to 2.5 pixels away from a contour point with respect to the raster of the digital image.

Virtually exclusively only the respectively most adjacent contour points are relevant for the calculation of the connectors. Computation steps can thus be saved when the sets of contour points, in particular for triples for the sorting-out process, are in fact formed skillfully. For this purpose, according to one development of the invention, a sorting device is provided which is connected upstream of the computation unit which is designed to determine the connection probabilities for possible connections between contour points, which sorting device outputs list data of contour points which are adjacent to a selected central contour point, in each case in accordance with a sequence which is maintained during the scanning of an area surrounding the central contour point by reading successive, exclusively adjacent, points in the surrounding area. By way of example, this is different to image data in conventional image formats. In this case, the data is organized in rows. Within one row, successive data items in the image file then admittedly belong to successive, that is to say also adjacent, pixels, but this is no longer true at the end of the row. In this case, there is a certain change from the last point in the row to the first point, a long distance away, in the next row.

At first glance, the process which is used for determination of contour points with subpixel accuracy, and the subpixel raster that is used, appears to contain redundant or superfluous information, hence slowing down the subsequent calculations, or making them more complicated. In fact, no additional points are actually calculated, but at most one contour point is determined with subpixel accuracy, preferably for each contour point in the raster of the image data.

As already discussed above, the invention allows memory to be used in an extremely economic manner. According to a further aspect of the invention an apparatus according to the invention may thus also be in the form of an integrated image processing apparatus which has one or more image memories and at least one integrated hardware unit for determination of contour points from image data, a hardware unit which is connected downstream from the integrated hardware unit for determination of contour points, for determination of links which belong to one contour between contour points, a morphology processor which is connected downstream from the hardware unit for determination of links, in order to determine the number of links which originate from contour points from contours to adjacent contour points, as well as a device for segmentation, by means of which objects are created from the data relating to the contour points and their links to further contour points, which objects describe the contours of the image data, with the hardware unit for determination of links which belong to one contour between contour points having an associated memory or memory area whose size is at most 20 percent of the total memory for the processing of the image data to objects which describe the contours, with the exception of the image memory or memories.

The invention will be explained in more detail in the following text using exemplary embodiments and with reference to the attached drawings. In this case, the same reference signs refer to identical or similar parts.

BRIEF SESCRIPTION OF THE SEVERAL VIEWS OF THE DRAWINGS

Figure 3:
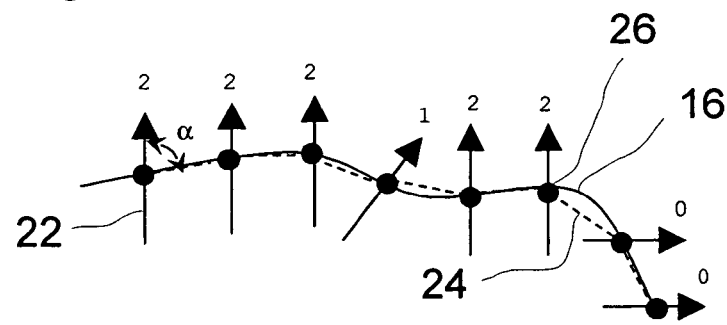
Figures 2, 4:
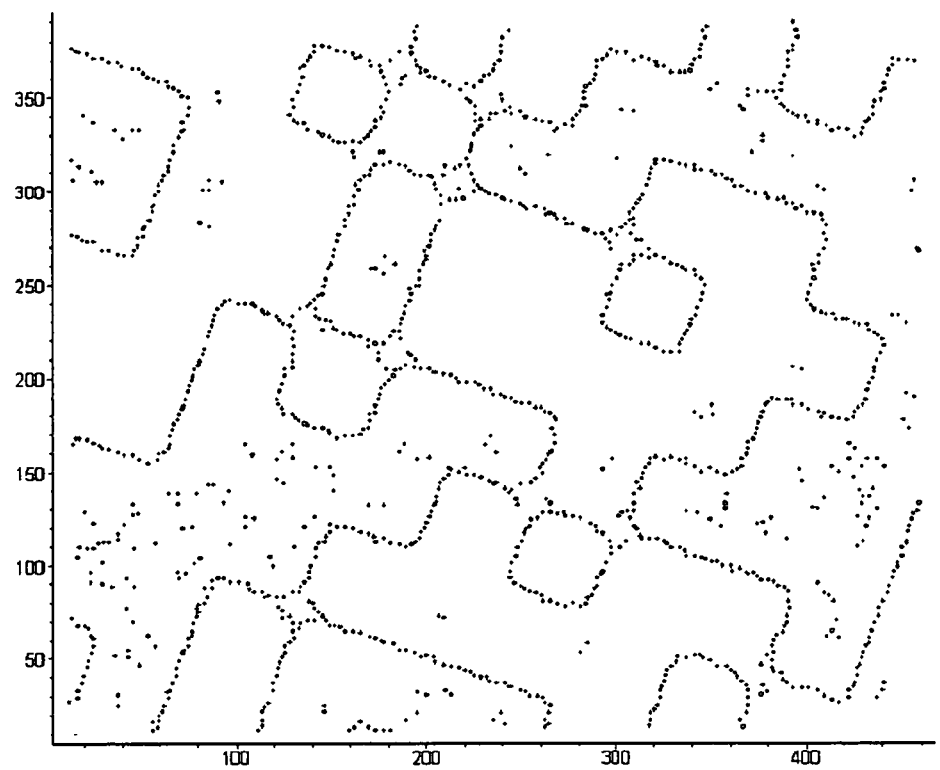
Figure 5:
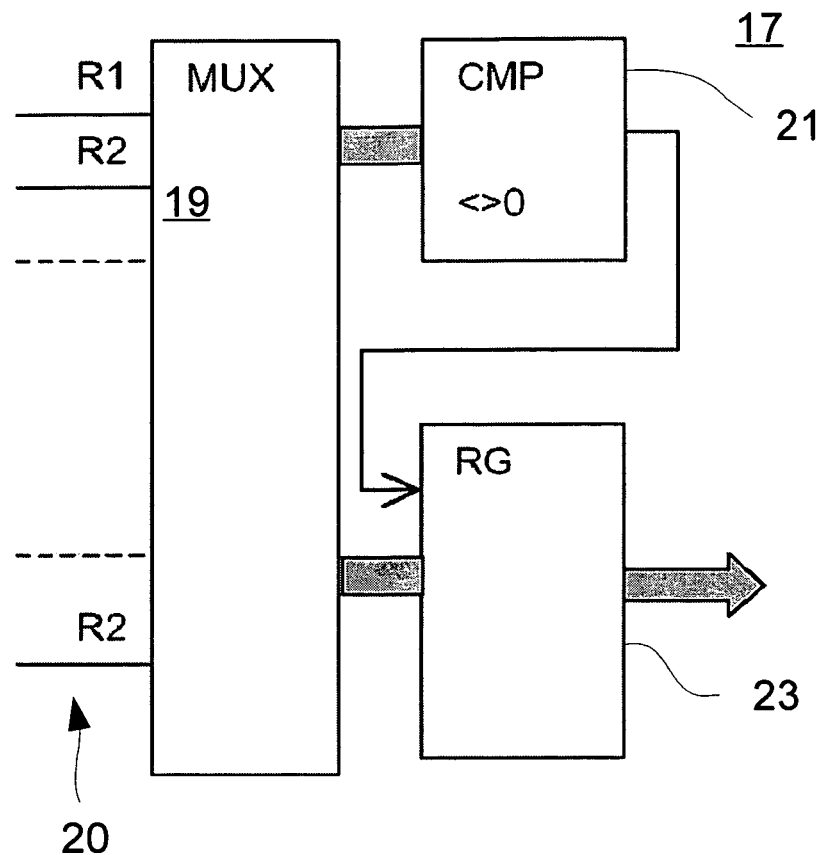
Figure 6:
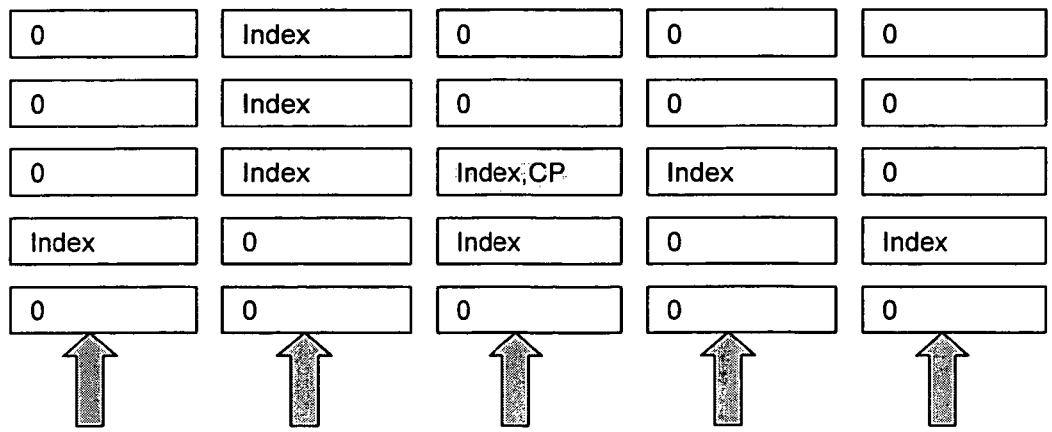
Figure 7:
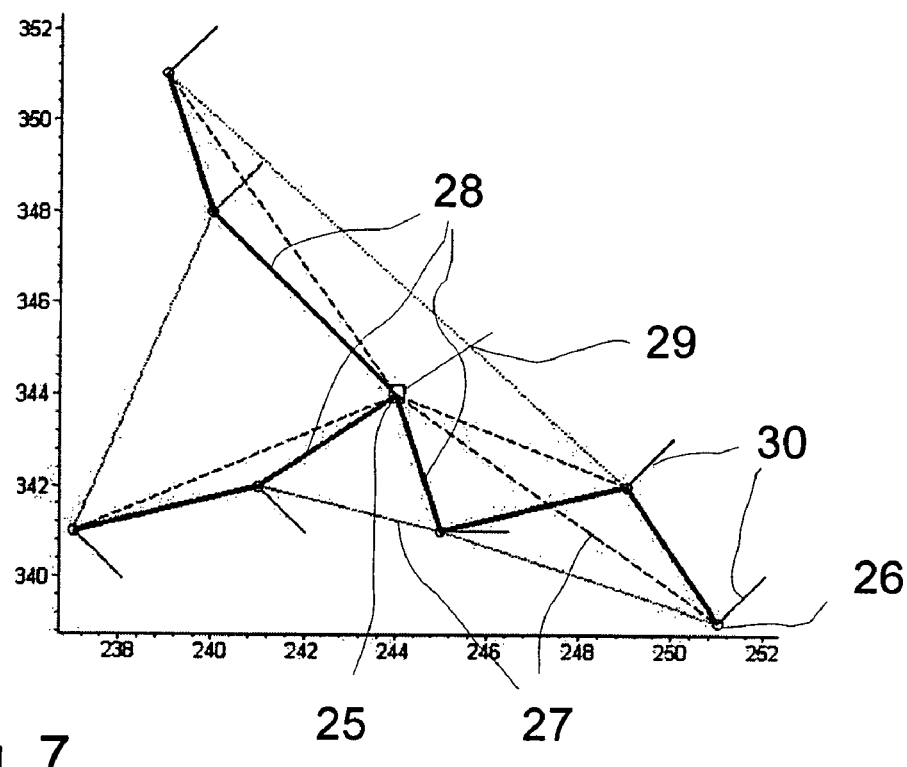
Figure 8:
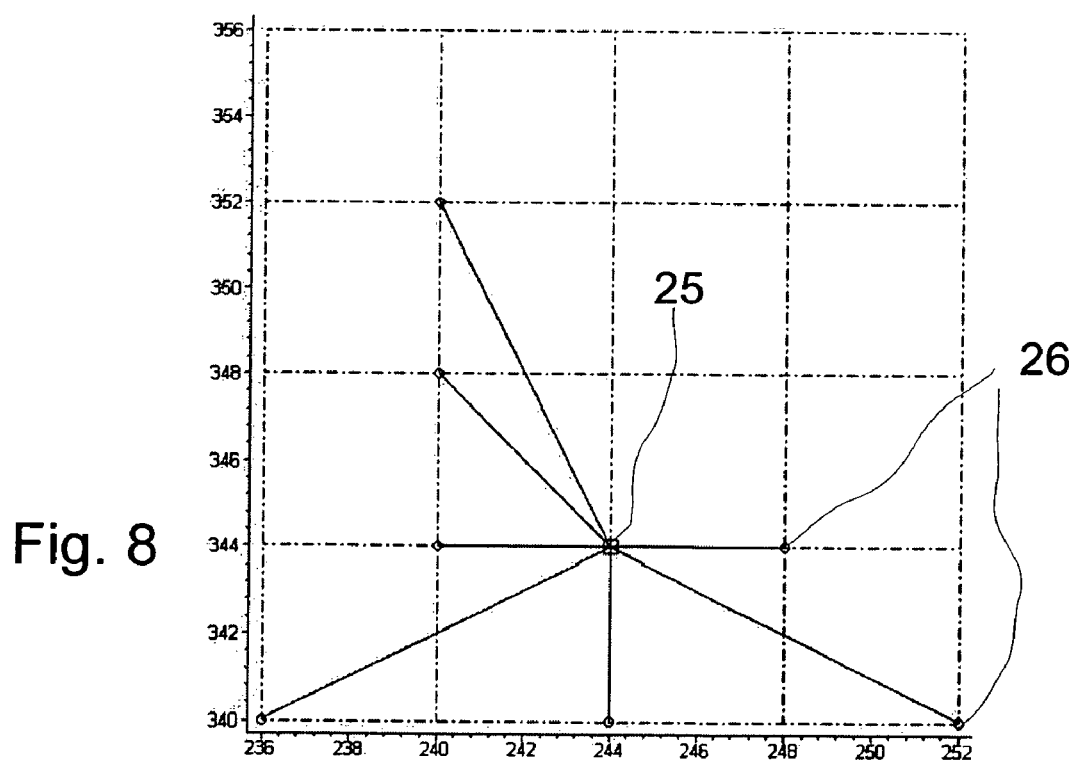
Figure 10:
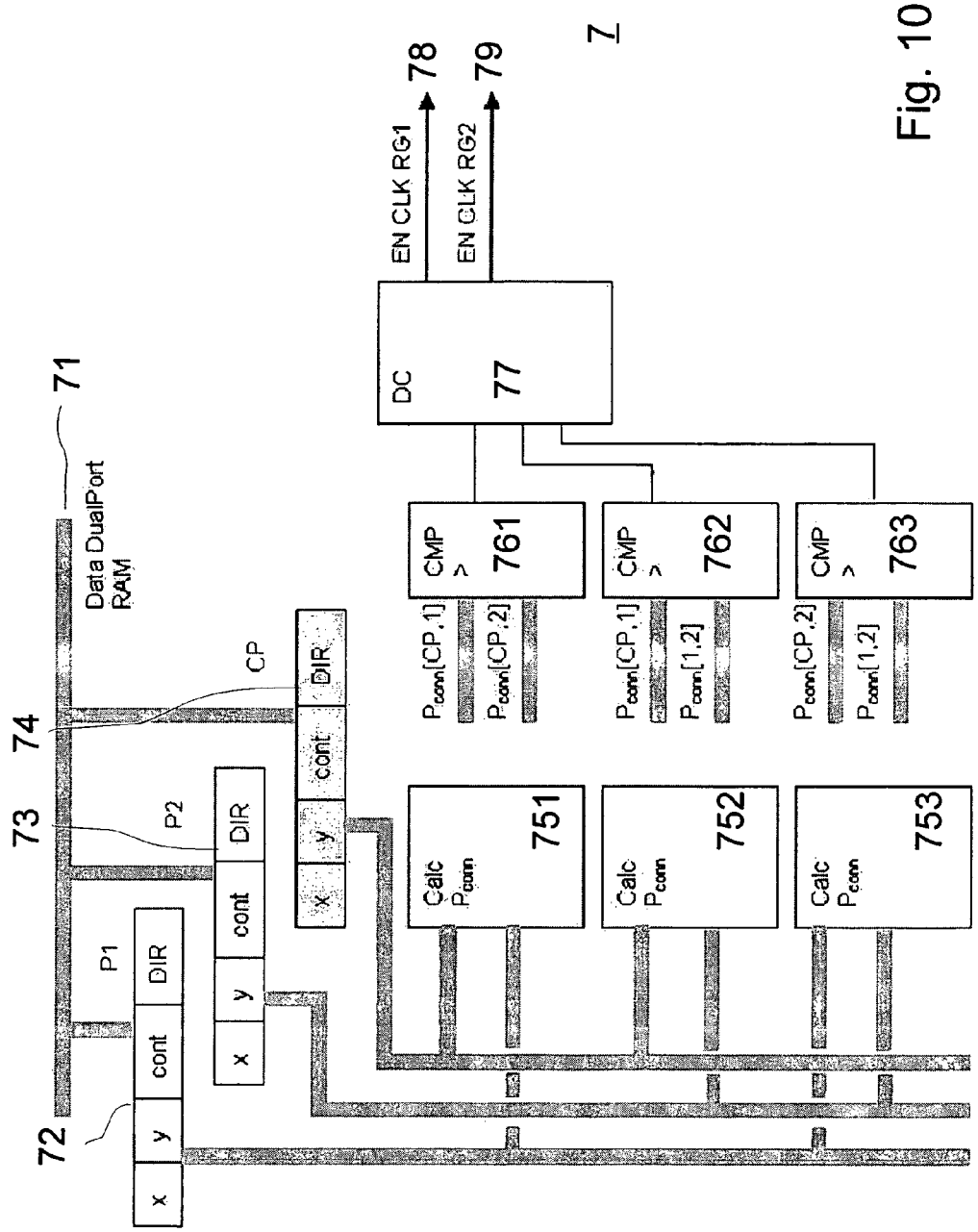
Figure 11:
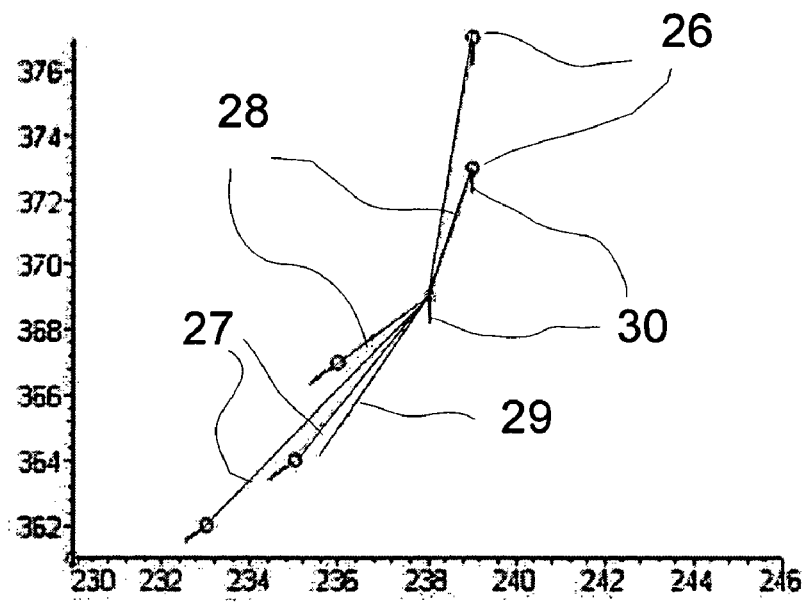
Figure 12:
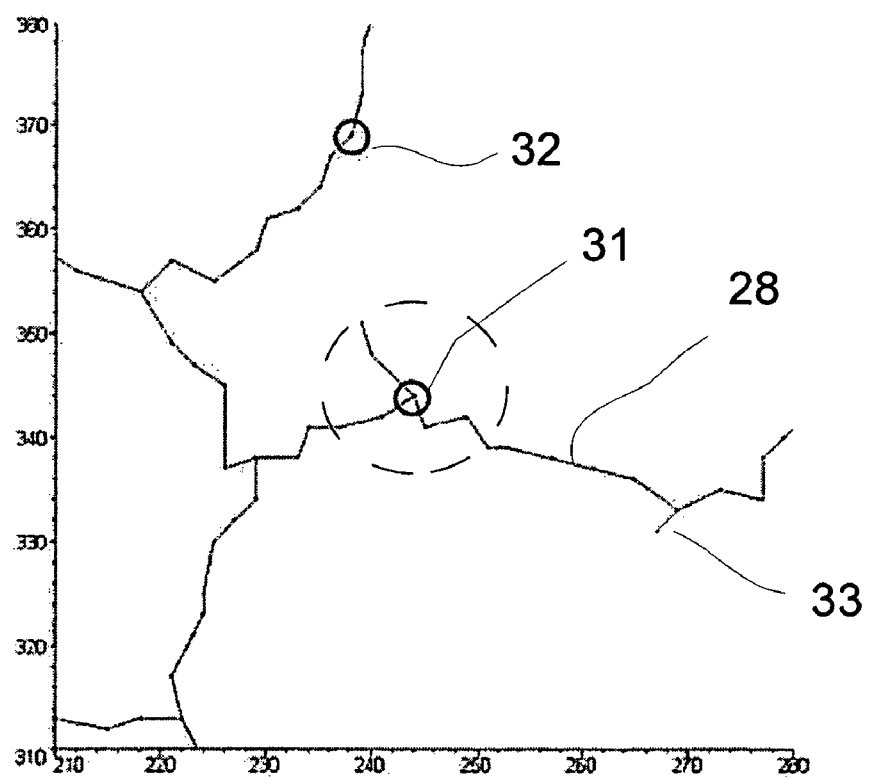

In the figures:

FIG. 1 shows the architecture of an integrated real-time image processing system (IRTIPS), FIG. 2 shows an illustration in the form of a graph of the contour point list, FIG. 3 shows, schematically, an area of a contour with contour points, connectors and point directions, FIG. 4 shows an organization principle for reading the contour points, FIG. 5 shows a circuit diagram of a sorting device, FIG. 6 shows an example of the distribution of contour points in a 5×5 area surrounding a contour point, FIGS. 7, 8, 9A to 9C show a calculation example, with FIG. 7 showing an arrangement of adjacent contour points in the subpixel raster, FIG. 8 showing the position of the contour points in the original raster, and FIGS. 9A to 9C showing tables with coordinate values and distances between contour points, FIG. 10 shows an illustration of an SNNC ("statistical nearest neighborhood classifier") for determination of connectors, FIG. 11 shows a further arrangement of adjacent contour points in the subpixel raster, FIG. 12 shows an illustration of a larger image detail with contour points and links determined by a sorting-out process, FIG. 13 shows the data structure of the data stored by the SNNC for further processing.

Figure 14:
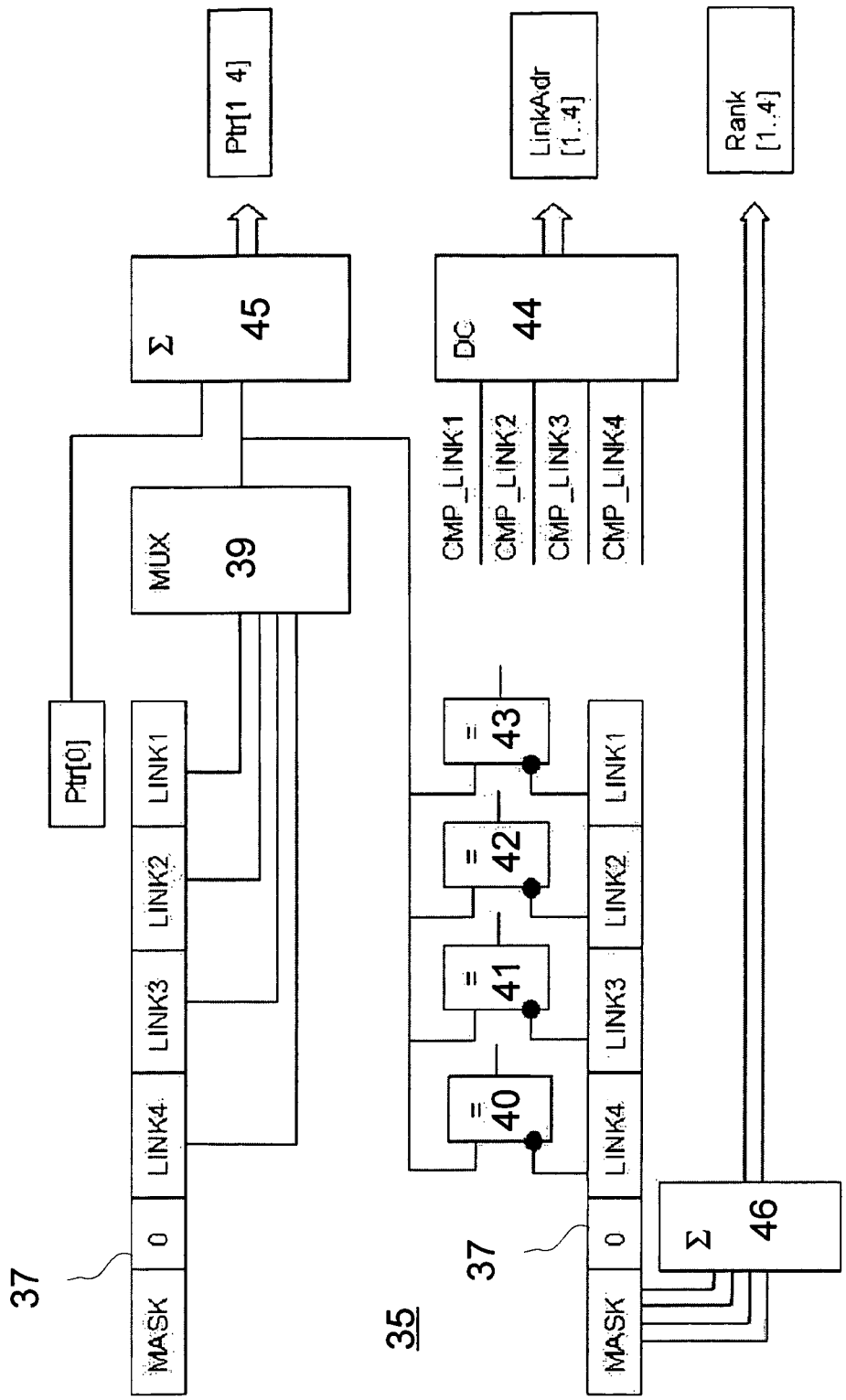
Figure 17:
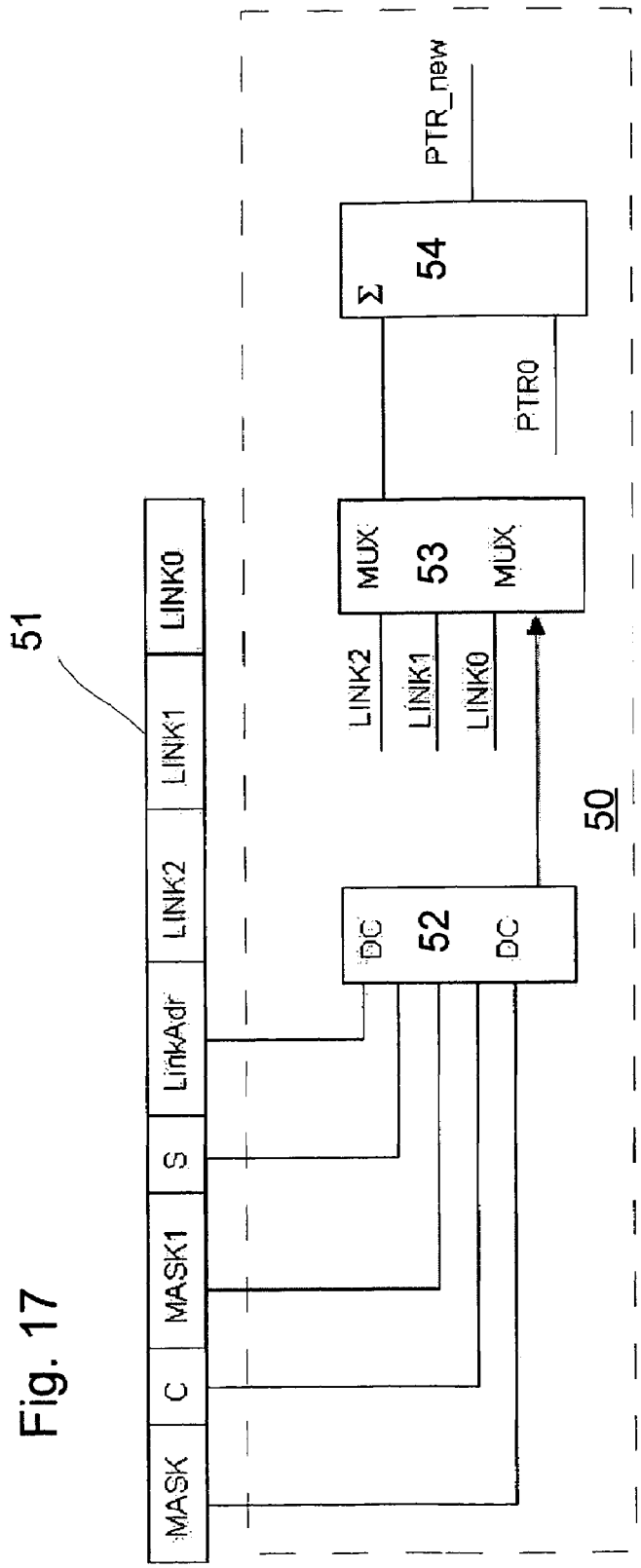

FIG. 14 shows a block diagram of a device in a morphological filter for production of ranking vectors, FIG. 15 shows an example of a data structure for a contour point list after morphological filtering, FIG. 16 shows an example of a data structure for a contour point list for storage of the data of singular points with a ranking greater than or equal to 3, FIG. 17 shows a device for reading a contour point list in an organized sequence as an organized row of contour points, and FIG. 18 shows the phase and the memory requirements of the processes for image processing.

DETAILED DESCRITION OF THE INVENTION

FIG. 1 shows the structure or architecture of an apparatus 1 according to the invention in the form of an integrated real-time image processing system IRTIPS. This IRTIPS comprises an image interface to which one or more image sources 3, for example CCD cameras, can be connected and which stores the image data as a digital image in an image memory 4. A contour point processor 5 in the form of an integrated hardware unit accesses this image memory 4 and is designed to scan the data of a digital image which is stored in the image memory 4, to determine contour points with subpixel accuracy, and to store this as continuous list data in a memory. The contour point processor 5 produces the coordinates and selected features of contour points in list form. Features are, for example, gray levels or colors of the adjacent regions, contrasts or directions.

The coordinates are output with subpixel accuracy within the "Regions of Interest", for example of horizontally arranged strips. In order to process images in a generally applicable manner, segmentation, that is to say splitting of the image into regions with homogenous features is preferably advantageous first of all, followed by the interpretation of these features.

FIG. 2 shows a graphical illustration of the contour point list. In addition to clear contours, in the example that of a disturbed data matrix code, there are a large number of points with generally low contrast, which can occur as a result of different surface disturbances or as a consequence of noise. The task of the subsequent processing units is now to describe the structure of the contours that are located between the individual regions in an organized sequence as a linked sequence of points, by means of hardware in real time, in order to approximate them in a further step, by means of software or further hardware, by digital geometric objects, in particular paths, circles, polynomials etc, and then to identify them.

The object of the invention is now achieved in particular by first of all defining the neighborhood of contour points using a statistical nearest neighborhood classifier 7 (SNNC). This SNNC 7 comprises a computation unit which determines the connection probabilities between contour points, taking into account the distance between the points, by means of a computation mechanism from the list data which is stored in the memory, and a classifier which selects subsets with at least three connection probabilities from sets of calculated connection probabilities, for possible links between at least three adjacent contour points, one of which is a previously determined central contour point, and sorts out for each subset that contour point which is adjacent to the central contour point and has a possible link with the lowest connection probability to an adjacent contour point, provided that the link does not connect two points which are adjacent to the central point, and then enters those contour points which have not been sorted out into a contour point list, with connectors which characterize the remaining links to the central point. This data is then entered in a memory 9. This memory 9 is particularly preferably a dual-port RAM.

A morphological filter 11 which reads the memory 9 is then used to select the relevant contours and to suppress irrelevant disturbances. In a third step, the contours are read in an organized sequence as linked objects or "chains". A further hardware unit then carries out a segmentation process on the basis of these chains.

The running of the process in the apparatus 1 is controlled by means of a microcontroller 15.

In order to integrate a structure which is as complex as this in a circuit in real-time conditions, strict pipeline processing is preferably provided. In contrast to known software solutions which operate on hardware platforms with adequate L2-cache support and can access different data structures close to real time, it is advantageous to accept restrictions relating to the memory size for complex integration since, on the other hand, this allows small high-speed SRAM areas, particularly in the form of dual-port RAMs, to be used, such as the memory 1 shown in FIG. 1. Furthermore, the processing quality of the individual step elements is then subject to more stringent requirements since the pipeline concept imposes restrictions on complex search and organization or correction processes. A typical memory size for high-speed internal SRAMs is preferably 4 to 16 kBytes.

The degree of integration which can be achieved is also governed in particular by the power losses, which in turn depend on the number of processing steps to be carried out. One particularly advantageous solution with a-minimum data flow in the respective process is obtained by using a compact list format for the representation of contour points, since only strictly determined accesses to structure elements are in each case required for the hierarchally constructed signal processing, so that it is possible to avoid complex accesses to image arrays with gray-scale or color data.

The task of the statistical nearest neighborhood processor 7 (SNNC) is to link contour points to contours. In order to define the neighborhood of points P[j] with respect to a central point P[i], the connection probability $P_{conn}[i,i]$ for the point set is firstly calculated and is then classified.

One simple and proven classifier is the interval $$p_{conn}[i, j] = \frac{const}{\sqrt{(x_i - x_j)^2 + (y_i - y_j)^2}}$$

A point belongs to the neighborhood NBD when $P_{conn}[i,j]$ is greater than a threshold value. Further neighborhood measures can be formed by supplementing $P_{conn}[i,j]$ with measures formed from the scanning directions DIR and/or contrasts. This makes it possible, for example, to appropriately link points which are located further away with the same direction, while noise points that are at right angles to this are not.

The decision can be considerably improved since an upstream contour point processor allows further information, including the local contrast cont as well as direction information DIR to be provided, by applying the threshold value for the connection decision P as a function of these parameters in the form of a table and/or ALU using the following function:

$$p_{conn}[i, j] = f\left(\frac{\Delta x y_{DIR} - \Delta y x_{DIR}}{\Delta x^2 + \Delta y^2}\right)$$

In the relationship quoted above, ?x, ?y denote the components of the vector representation of a link and $X_{DIR}$, $Y_{DIR}$ denote the components of the mean point direction. The argument of the function f is maximized when the angle α is 90°.

For illustrative purposes, FIG. 3 shows an area of a contour 16 on which contour points 26 are located. The links 24 between most closely adjacent contour points 26 are shown in the form of dashed lines. The mean point directions 22 of the contour points 26 are shown as arrows. The mean point directions may be characterized, for example, by means of the numbers indicated on the arrows. In the example shown in FIG. 3, the contour points 26 have three of the eight possible point directions that are used here, corresponding to the numbers 0 to 7. As can be seen from FIG. 3, the angle α is in each case the angle included between the mean point direction 22 and the link 24 between two contour points 26.

If the probability $P_{conn}[i,j]$ is greater than a threshold value "Threshold", a link is produced.

Each central point on a continuous contour generally has only one predecessor and one successor with an interval which is governed by the pitch of the raster being used. In practice, however, this relatively narrow definition leads to contours tearing open and being stored as separate objects, thus resulting in a not-inconsiderable amount of complexity in the subsequent processing. The task of the SNNC is therefore, inter alia, additionally to link contour points which are separated by a distance which is greater than the pixel interval of the scanning raster.

The optimum distance is dependent on the specific conditions, but it has been found that a value of 2 to 2.5 times the pixel interval results in a considerable improvement in the contour quality. However, this is at the expense of an increase in the number of possible candidates for a neighborhood, which are processed in real time.

The task of the SNNC 7 is now to determine the topologically relevant neighbors within the neighborhood NBD. According to the invention, this object is now achieved by forming triples comprising the central point $P_i$ and any desired combination of two further points $P_{j1}$ and $P_{j2}$ from NBD from the set NBD, and by calculating the connection probabilities:

$$P_{triplet=(P_{conn}[i,j1], P_{conn}[j1, j2], P_{conn}[i,j2])}$$

The triple or triplet mentioned above thus represents a vector with the connection probabilities between all of the links between a selected central contour point and two adjacent points in each case, with all of the points within at most 2 to 2.5 times the pixel interval being considered as adjacent points.

If it is found that the connection probability $p_{conn}[j1,j2]$ is greater than a predetermined threshold "Threshold", then the triple is analyzed and the link with the lowest probability is deleted. The hardware implementation also provides an efficient sorting machine, which first of all determines triangles. As a result of the test condition, however, only those triangles with the respectively shortest distances on the outer polygon, and the closest neighbors to the contour points, are relevant. Operations can thus be saved by use of organization principles.

FIG. 4 shows a scheme illustrating how list data can be read from contour points which are adjacent to a selected central contour point, by means of a suitable sorting device. The instantaneously selected central contour point is annotated "CP". The contour points are stored with subpixel accuracy, with a maximum of one entry per pixel. The triangles described above can therefore be produced by continuous scanning of the neighboring points, for example in the clockwise direction. The numbers 1 to 24 indicate the sequence of reading contour points within a 5×5 surrounding area with list data. The contour points, or their list data, are/is therefore read in the sequence from the image area of a surrounding area with a maximum distance of 2 pixels from the center point, as they are output in accordance with this sequence by the numbers which are indicated in the pixels, and list data of contour points. The pixel annotated "1" is accordingly read first of all, followed by the pixel annotated "2", and so on until the last pixel "24" in this surrounding area. Successive, exclusively adjacent, points in the area surrounding the central point are thus read.

FIG. 5 illustrates a refinement of a sorting device 17 such as this. By way of example, a shift register for indexes (addresses) of the contour points in a dual-port RAM is used for addressing. Whenever a positive decision as a contour point is allocated for a pixel, this contour point is given the next subsequent address in the dual-port RAM, and is in turn inserted as the index (part of the address) into a shift register. If the next subsequent pixel is not a contour point, a zero is entered in the shift register. This shift register has a length of n×m, for example 5×24, and can thus store 120 indexes. Since contour points are rare, a small number of bits is sufficient, for example a word length of 6-8 bits.

FIG. 6 shows one example of the distribution of contour points in the 5×5 area surrounding a central contour point. The entries annotated "index" indicate that the relevant pixel is a contour point. A local 5×5 surrounding area is produced in a known manner by taps on the appropriate registers. These registers are now read via inputs 20 of a suitably connected multiplexer 19 such that the sequence illustrated in FIG. 4 is produced at the output of the register 23. This process is started precisely when the central point CP is not equal to zero, that is to say when a neighborhood to be analyzed is represented in the register set and the point CP is a contour point.

Whenever the output value from the multiplexer 19 is not equal to zero, the index is shifted into an output register 23, which directly addresses data from the dual-port RAM. A comparator 21 which acts on the output register 23 is used to determine whether the output value from the multiplexer 19 is not equal to zero.

In order to decouple the sorting process from the continuously running contour detection process, further FIFO buffers or registers can be inserted typically for 8 to 12 contour points in the output data stream, and can then also read the contour points which belong to a neighborhood more than once repetitively, so that it is possible to produce all of the contour point combinations which are required for the sorting process. In principle, it is also possible to speed up this sorting process by parallel working, for example by connecting two or more multiplexers in parallel.

The allocation of indexes illustrated in the example in FIG. 6 corresponds to the surrounding areas in the calculation example, as described in the following text with reference to FIGS. 7, 8, 9A to 9C, for calculation of connectors between contour points which belong to a common contour.

First of all, FIG. 7 shows the position of a central contour point 25 and of adjacent contour points 26 with possible links 27 of a contour in the subpixel raster. In this case, the indexes of the pixels are plotted on the axes of the graph. FIG. 8 shows the same points in the original raster of the image data. FIG. 8 clearly shows that the relevant adjacent contour points, which belong to a contour together with the central point, can be identified considerably less well in the original raster and allow graphs to be drawn.

In the example, the connectors have been calculated with a subpixel accuracy of ¼ pixels. This example is illustrated with distances as a measure of the reciprocal connection probability, for simplicity reasons. The subpixel coordinates (columns X, Y) of the contour point arrangement shown in the upper part are illustrated in the left-hand table (FIG. 9A). The table starts with the central point CP. The subpixel coordinates of the contour points are entered in the column annotated "Field", with these being the contour points which result from the scanning as shown in FIG. 4 for the surrounding area shown in FIG. 6. The following contour point sequence is thus addressed in the dual-port RAM in the example: CP, 7, 9, 13, 18, 19, 22, 24, 7. The figure additionally shows the main direction 29 of all the contour points in the area surrounding the central point, as well as the point directions 30.

The relative distances [Xrel, Yrel] to the central point are calculated from the subpixel coordinates, as listed in the tables in FIG. 9B. The distance $\rho$ to the central point is in turn determined from this. The pixels with the indexes 7, 9, 13, 18, 19, 22, 24, 7 form a polygon at whose center the central point CP is located. The sides of the polygon [X_Poly, Y_Poly] form triangles with the links to the central point, that is to say the triangle <CP, "Field" 7, "Field" 9> by way of example. The longest side in this triangle has a length of 8.602 subpixels, and is thus longer than the two other sides with lengths of 5.385 and 3.606, so that this longest side represents the lowest connection probability between the three contour points. The longest side is thus deleted from the list of contour points to be linked. This operation is carried out for all of the triangles. During this process, two further points are deleted, that is to say a total of three points. This sorting-out process affects in particular the contour points with the indexes 9, 18 and 24. Four connectors which have not been sorted out remain, with one connector connecting the start and end of the polygon. The remaining contour points are listed in the table in FIG. 9C. The sorting-out process is now repeated for the remaining connectors or contour points. During the repeated sorting-out process, the contour point with the index 12, or the first contour point listed in the table in FIG. 9C, is also dropped.

This connector can be investigated at the end of the analysis, with a further connector being dropped in this case. The three connectors 28 in FIG. 7 then remain, and are stored in the list data. In this example, the calculation accordingly results in the connectors from the central point as a contour point to the three further remaining points representing the one or more contours to which the central point belongs. After passing through this filter, as described above with reference to FIGS. 7, 9A to 9C, or sorting-out process, the SNNC 7 accordingly has the information as to which contour points from the contour point list are linked to the central point.

In the case of the example shown in FIGS. 7, 9A to 9C, the sorting-out process has been described on the basis of a very simple classifier for the connection probability, specifically a classifier which depends only on the distance between the contour points. The identification of the relative links between contour points can, however, be improved considerably by using additional attributes of the contour points for the calculation of the classifiers. In this case, this means in particular using the direction and/or the contrast of the contour points. The direction may, for example, be a direction vector which is at right angles to the edge in the image data whose contour is to be determined. Direction information can also be simplified in this case by a reduced number of possible directions, for example 8 possible directions being determined and stored as an attribute by the contour point processor 5. The direction of a connector is then obtained from the connection vector between the central point i and one of the outer points j in the neighborhood. The angle α between the stored mean point direction and the connector can then be determined from these two direction statements. By way of example, a function of the angle α, for example its sine or cosine, and the distance between the points can then be used as a classifier for the connection probability.

The connection probability can also be linked with a contrast measure in order to give preference to high-contrast contours over low-contrast contours, for example by using a multiplication by the magnitude of the mean point contrast of the connecting element for classification of the connection probability. This is particularly advantageous in the case of scenes or thin lines whose contrast is low overall.

FIG. 10 shows a circuit diagram of an SNNC 7 for determination of connectors. The method of operation of the SNNC 7 will be explained in more detail with reference to this figure. The contour points can be addressed in the required sequence by the sorting device. The information about the coordinates, the contrast and the point direction [x,y,cont, DIR] is available at the data input 71 of the SNNC, and the data is read into registers 72, 73, 74 with a word length of 32 bits.

A computation unit 75, which will be described in more detail further below and is referred to in the following text as "Calc $P_{conn}$" now calculates the connection probability between the three contour points of a triangle. A central point is selected by address decoding for this purpose. In the example illustrated in FIG. 10, the data for the central point is loaded in the register 74. Newly arriving contour points are read into the two registers 72 and 73. The three possible combinations of the connection probabilities are analyzed by means of the comparators 761, 762, 763 and the downstream decoder 77. If the lowest connection probability between the central point and one of the two points lies on the polygon, or there is no connection to the central point, then the relevant connection is deleted, depending on which of the two contour points adjacent to the central point set either the bit EN_CLK_RG1 or the bit EN_CLK_RG2 at the outputs 78 or 79, respectively. The indexes of the three points taken into consideration are stored in parallel with the data. The index of the point which has not been deleted is transferred to a shift register, with the index difference for the central point being calculated for this purpose, and being stored with the next clock cycle.

The computation units Calc Pconn 751, 752, 753 receive the sequence of contour points addressed with the register output 23 in FIG. 5, with their attributes, and calculate the connection probabilities, and compare these with one another in conjunction with the comparators 761, 762, 763 and decide, in the decoder 77, the connections to be deleted for each analyzed triple. The signals EN CLK RG1 and EN CLK RG2 for the contour points P1 and P2 are produced at the output and control the deletion of connections. Further triples are then analyzed. After a sufficient number of processed triples, unmarked connections remain whose result is connectors which contain the indexes of adjacent contour points and the connection probability of the contour point i with the central point CP and with the next subsequent neighbor i+1.

However, ambiguities can occur in the calculation of connection probabilities and are expressed by isosceles or equilateral triangles. In order to avoid morphology disturbances without complicated logic (for example small triangles in the contours), a computation device can advantageously be added in order to apply modulation to the comparators of the classifier, for example modulation in the form of a pseudo-random geometric noise, which gives the impression of a raster which is not entirely regular. Via a table, a marginal noise component is added to this, for example with 10% of the pixel interval for the coordinate difference for the relative distances ?x and/or ?y to the central point.

FIG. 11 shows a further arrangement of adjacent contour points in the subpixel raster, which is obtained from image data from a different point in the digital image. In this example, and in contrast to the surrounding area shown in FIG. 7, only two relevant connectors 28 have been determined by sorting out from the possible connections 27.

FIG. 12 shows an illustration with contour points and connections determined by sorting out, representing a larger image detail. Only the connections 28 are illustrated, for clarity. As can be seen from this figure, the connectors 28 arranged in a row with one another result in the profile of contours in the digital image. In FIG. 12, two sections 31, 32 are marked with circles. The section 31 indicates the three connectors 28 determined from the surrounding area shown in FIG. 7, with a branch originating from the central point. The section 32 denotes the connectors 28 in the surrounding area shown in FIG. 11. The dashed circle indicates the area with the surrounding area of all the contour points shown in FIG. 7. FIG. 12 in this case clearly shows that the situation shown in FIG. 11 of a continuous contour is more probable than the occurrence of a branch.

Furthermore, FIG. 12 also clearly shows that this simple method for sorting out leads to identification of contour lines with only a small number of artifacts. Otherwise, by way of example, only short lines will be additionally expected, which are isolated or originate from the contour lines. Only one such short line 33 can be seen in the image shown in FIG. 12.

FIG. 13 shows the data structure of the data stored by the SNNC 7 for further processing, preferably in a further dual-port RAM, with connectors or information about the links between the respective point and further contour points. The information about the links to adjacent points is also referred to in the following text as "LinkInfo".

The index of the central point i forms the address at which the LinkInfo is stored in a dual-port RAM (see further below). Each permissible contour point (EN=1) produces a further index j (Pointer), and the difference $$\text{LINK}[n]=j_n-i$$

is annotated LINK. All of the neighbors in the contour point list can be addressed from one central point with the knowledge of the LINKs. Because of the structure of the SNNC, there are a maximum of 4 LINKs per central point, and five or more neighbors are resolved into a plurality of neighborhoods. The mask MASK indicates whether the relevant LINK is or is not set. In parallel with this, the attributes are stored by the contour point processor in the same memory, so that the coordinates as well as the gray level and, if required, color information are available.

The morphological filter 11 illustrated schematically in FIG. 1 will be described in more detail in the following text.

The contour points which are uniquely connected in this way cannot yet be read as objects because two preconditions are lacking. Firstly, the start and end points of the contours have not yet been defined, and secondly there are a large number of existing artifacts which would unnecessarily load the resources for object segmentation. The morphology of adjacent points is therefore investigated by means of the morphological filter 11, before the points are combined to form objects on the basis of the connectors. The morphological filter 11 is now designed to filter the contour point list with connectors with respect to at least one of the following characteristics:

contour points relating to chains of at most three contour points are deleted,.

contour points which belong only to a chain which is linked to a longer chain at one end and has at most three contour points are deleted, contour points which form start and end points of chains of associated contour points are identified in the contour point list, contour points which form branching points of at least two chains are identified in the contour point list, coincidences are corrected, and a double linking process is carried out.

A function which is implemented in the filter 11 and is referred to in the following text as a "RankFilter" is used first of all to carry out these functions. Ranking vectors for contour points are formed by means of this function. For this purpose, the contour point list of the data structure shown in FIG. 13 and with a connector structure is read and the connector structure of all adjacent points is in each case read in, starting from a central point, via the connectors, and a ranking vector is produced which includes the number of branches of the adjacent points and of the central point itself. The rankfilter thus determines the number of connections originating from one contour point, in this case by formation of the sum of the bits set in the mask MASK. A quadruple branch would thus have the ranking 4, MASK=1111B, a chain element such as the central point shown in FIG. 11 would have the ranking 2, and in general MASK=0011B.

The rankfilter addresses the adjacent LINKs permitted via MASK and thus determines the ranking for each contour point in the neighborhood. A ranking vector is formed from the rankings determined in this way, and includes the structure information about the number of branches of the adjacent points.

Since the linking of the points can be called up from all directions, a double link with a marking for points which have already been read is worthwhile. A link address LinkAdr is therefore generated, and indicates at which of the four possible positions of the addressed adjacent point the inverse Link to the initial point is stored. The LinkAdr is stored once the morphological filtering process has been carried out.

Since the sequential procedure for a Link to an adjacent point and of the inverse link back to the central point always results in the pointer difference zero, this address can be found relatively easily using comparators. This results in a structure which allows the index of the adjacent, linked contour point to be found with only one access, and allows linked contour points to be read at high speed.

One particularly advantageous embodiment of a rankfilter 35, preferably as a component of the morphological filter 11, is illustrated in FIG. 14. First of all, the LinkInfo of the central point with the address Ptr[0] in the dual-port RAM is read into the input register of the rankfilter by the rankfilter 35 from the data structure 37 from the dualport RAM 9, as is also shown in FIG. 13. The LINKs 1-4 are then addressed via a multiplexer 39, the addresses Ptr[1 . . . 4] are calculated by addition, and are called up in sequence. LINKs which are not required, identified by a zero on the associated bit in the mask MASK, can be jumped over. The pointer address of the central point is added to the relatively stored LINKs by means of the adder 45, after which the list can be addressed directly. The LinkInfo is read in in this way. The connected comparators 40, 41, 42, 43 of the morphological filter 11 or of the implemented rank filter 35 compare the LINKs of the contour point addressed by Ptr[i] with the LINK[i] of the central point. Four (3) comparators compare the relevant LINKs. If one of the pairs is complementary to one another, the relevant comparator 40, 41, 42, 43 generates a signal CMP_LINK[1 . . . 4] so that the LinkAdr can be decoded from this by means of the decoder 44.

The ranking RANK[1 . . . 4] can also be determined in the same process and can be collated to form a ranking vector <RANK[1], RANK[2], RANK[3], RANK [4]> by adding the mask bits by means of the adder 46. The ranking vector is processed within the morphological filter in order to make a binary decision about the further permissibility of a connection which was previously declared to be valid, and is stored in the structure MASK.

Furthermore, disturbances in the contours which have been connected as described above and which lead to a series of small artifacts (particularly in the case of high resolution and/or sensitivity) and will be segmented on the basis of their arrangement with respect to objects are overcome by means of the morphological filter. This is disadvantageous for the efficiency of the subsequent processing steps. Relatively small disturbances are therefore corrected by the morphological filter even before object segmentation.

The method of operation of one function of the morphological filter 11 will be described in the following text. This function is referred to in the following text as "MorphFilter". Once the ranking and LinkAdr have been calculated, a simple filter can be produced. For this purpose, disturbing small structures, "appendixes" with 1 or 2 contour points are deleted first of all. One such appendix is, for example, the short line 33 in FIG. 12. Structures such as these can be seen on a number of the branches of their neighbors (in brackets), for example on the following ranking vector: <1,3,0,0>. The contour point with this ranking vector is linked to the main contour via a singular point of ranking 3. The point should be deleted, the singularity of the main contour or of the branching point is reset to the ranking 2. The operation can be illustrated by the following Maple program code:

```
if RankVector=[1,3,0,0] then
  MASK[Ptr[1],LinkAdr[Ptr[0],1]]:=0: MASK[Ptr[0],1]:=0:
  MASK[Ptr[0],2]:=0: end:
```

The central point has the ranking 1 and is located in first place in the ranking vector. LINK[1] of the central point refers to a contour point with the ranking 3. The LinkAdr[Ptr[0], 1] in this case indicates where the inverse LINK to the central point can be found on the contour point with the ranking 3. Ptr[1] addresses the contour point with the ranking 3, that is to say the operation MASK[Ptr[1],LinkAdr[Ptr[0],1]]:=0:

deletes the link to the single contour point, and the ranking is reduced from 3 to 2. The singular point therefore subsequently behaves like a normal component of a linked list, that is to say no branching occurs. Two fewer objects are generated for the subsequent processing, avoiding the combination of two valid relatively long objects to form one object.

A further example is a contour point with a ranking vector <2,4,1,0>. This is an appendix with two contour points. The two contour points are linked with the main contour via a link of ranking 2 and a singular point, or a branch of ranking 3. An appendix such as this can be deleted by a filter which carries out a function analogous to the following Maple code.

```
if RankVector=[2,3,1,0] then
    if LinkAdr[Ptr[2],1]=1 then      L:=2
    else L:=1: end:
    MASK[Ptr[1], LinkAdr[Ptr[0],L]]:=0:MASK[Ptr[0],1]:0:
    MASK[Ptr[0],2]:=0:MASK[Ptr[2],1]:=0
end:
```

The edge point with the ranking 1 is located at LINK[2], LinkAdr[Ptr[2],1] points to the inverse LINK to Ptr[0.] which is the next point seen from the edge. Since Ptr[0] has the ranking 2, the other LINK (L) must point to the singular point Ptr[1] of the main contour with the ranking 3. In consequence, the function MASK[Ptr[1],LinkAdr[Ptr[0],L]]:=0: deletes the LINK from Ptr[1] to Ptr[0] and reduces the ranking from 3 to 2, and the link is deleted.

The interchange situation <2,1,3,0> can also be filtered in an analogous manner.

The function "Morphfilter" can also produce further important information for-segmentation by analysis of the ranking vector:

classification of start and end points of chains
classification of linked singular points,
classification of singular points whose ranking is 3 or more.

For this purpose, the ranking vector is mapped onto the target function via a table or Boolean logic. This is marked by setting appropriate bits in the LinkInfo in the contour point list. The data structure illustrated in FIG. 15 has been found to be particularly advantageous in this case for connectors after filtering by means of a MorphFilter. A maximum of 3 LINKs are required for contour points of ranking 2, since appendixes can be cut off only for points of ranking 3.

The additional bits to those contained in FIG. 13 mean:
C: continue (1 bit for segmentation),
S: start/end point (1 bit),
MASK1: corresponds to bits 0 to 2 of MASK,
LinkAdr:corresponds to the LinkAdr[0-2], as described above, the fourth is not required.

When the information is subsequently read, the format shown in FIG. 15 is identified by decoding of the ranking of MASK (ranking equal to 2).

Singular points with a ranking of greater than or equal to 3 can be coded using the data structure illustrated in FIG. 16. In this case, the entry CONN33 denotes a connector matrix for the linking of singular points of ranking 3 or 4. When the information is subsequently read, the format illustrated in FIG. 16 is identified by decoding of the ranking of MASK. (ranking greater than 2).

The additional information is used at the time of segmentation. MorphFilter therefore stores the structure in RAM.

The information processed in this way in the contour point list can be read directly from the memory in an organized sequence as an organized series of contour points, which is. also referred to in the following text as a "chain", so that successive list entries belong to successive contour points along a contour.

The chains are in this case determined using a structure which is referred to in the following text as GetNextCP. GetNextCP reads the LinkInfo of the central point in a process which is delayed with respect to the MorphFilter. The delay is typically 8 columns, but may also be chosen to be higher for larger memories. ChainReadOut scans the incoming contour points for start and end points. In the data structure shown in FIG. 15, these have the features ranking (MASK)=2 and S=1.

Once a point such as this has been found, the LinkInfo of the two adjacent points is evaluated, looking for the singular point (ranking 1 or 3, 4). If only one neighbor with S=1 is found, then this is declared as a start point. This forms the first representative of a chain. Furthermore, the link to the next point is generated. All the elements of the chain are provided with a new segment number, which is also passed on to all the other representatives in the associated point set. If two singular points are adjacent, the first to be found is used, and the remainder result automatically. If the "continue" bit has been set, the structure of chains is continued.

GetNextCP first of all uses MASK to determine the responsibility, which is defined in accordance with a table stored in a decoder. The table provides the number of neighbors as well as the positions which can be accessed. The pointer to the neighbors and the addresses of the two LINKs is calculated from the LinkInfo in the contour point list.

FIG. 17 illustrates one possible structure of the GetNextCP structure 50. The data structure 51 with the entries MASK, C, MASK1, S and LinkAdr, corresponding to the data structure illustrated in more detail in FIG. 15, controls the linking to form chains. The table mentioned above is stored in the decoder 52.

When a start point (S=1) has been addressed, then its ranking is 2 and it thus has two neighbors. In this case, the decoder 52 selects both possible links, decodes the link with a neighbor which does not correspond to the ranking 2 and sets the start point of a chain to this contour point, by generating the value PTR_Start. The other link is passed on via the multiplexer 53 and the adder 54 as a new pointer PTR_new.

Once S=0 has been found, that is to say if the contour point is not a start point or end point, only one link is selected. The selection is controlled via the mask bits MASK1. Since a new pointer PTR_new has been generated, the associated mask bit is automatically reset, thus precluding repeated addressing of the same contour point. Linked contour points are assigned a segment number. Since LinkInfo is no longer required from this state, the low part of the data word can be used for this purpose.

The pointer addresses are continuously monitored during the process. When a signal out_of_range occurs, that is to say when the permissible index goes beyond the predetermined lower or upper limit, the process is terminated. The C bit (continue) is set at the corresponding contour point, and the segment number is stored. If the pointer is within the permissible range when read repeatedly, the process can be continued. A sequence of pointers organized for each segment is produced at the output of the process. Since the corresponding contour point attributes have been stored correlated with these pointers, the attributes can be read directly.

The following exceptions can also occur during the processing of the chains:

1. Both start points of a chain are processed, so that two differently indexed segments adjoin one another (coincidence)
2. Neither of the start points is processed, either because the object has none (for example in the case of a circle or a closed contour), or because the start points are well away from the current scanning position, so that they cannot be detected,
3. The contour intercepts the image boundary (edge points).

In the first case, chains with two different segment numbers adjoin one another but do not run into one another because the mask bits prevent this. The apparatus can use the test for termination for a ranking that is not equal to 2 to identify the fact that this is a so-called coincidence. The relevant ranking 2 of the coincidence point is dealt with as a singular point which connects segments to one another, with the only difference in this case being that only one object is present.

In the second case, a further test is carried out after reading the chains, which analyzes neighborhoods of the type <2,2, 2,x> which have not yet been processed and then generates a start point. The rest of the processing is carried out as described above.

Edge points, which can occur between successive strips, are dealt with in the same way as coincidence points with a ranking of 2, and are then referenced to one another.

The contour point processor produces a continuous data stream of attributed contour points via a first port, and in the worst case, with very finely resolved gray-scale images, approximately 20 to 25% of the pixels are stored as contour points.

One implementation for a normally small dual-port RAM of 1k×36 bits will be described in the following text, and this can also be processed as a set of contour points such as this. This dual-port RAM can be used to temporarily store an image extract with 512 contour points including the additional information and attributes, corresponding to a minimum pixel block with a size of 70×26 pixels in this example. The contour point processor reads the image data in a plurality of strips, which each have a width of more than 1 pixel, preferably at least 16 pixels, and particularly preferably 26 or 32 pixels. In the following example, strips with a height of 26 pixels are read in a meandering shape over the entire image width, after which the next strip is read. The data is stored as a list, and coordinates are kept in the attribute.

The contour point processor 5 starts with the storage of the contour points. Once 5 columns have been entered, the SNNC 7 can start to process, and the contour point processor 5 in consequence continues.

The maximum pointer address can be calculated exactly. For this purpose, the address index for each column jump is stored, and is read with a delay of 5 columns, although a constant offset, for example of −32, is also sufficient in practice, since the memory is sufficiently large. First of all, the SNNC 7 reads 5×5 neighborhoods from the dual-port RAM, and stores attributes of the relevant contour points in a register set.

The MorphFilter process in the morphological filter 11 requires completely stored and filtered links, for which reason a safety margin of 3 columns is maintained for processing of the data by the SNNC 7.

The segmentation process, on the other hand, requires an even greater separation. This is because the contour tracking method is more computation intensive. In order to avoid tedious combination of contours, the contours should be tracked without disturbances over as great a length as possible. A typical value for this is 8 columns. Whenever a start point or a set continue bit has been found from a previous operation, the GetNextCP structure 50 is adjoined.

This is expediently not controlled via the dual-port RAM but via a separate single shift-register structure, in order to save memory bandwidth.

After processing about 3 columns since the contour point processor 5 has carried out a storage operation, the SNNC will have completed its process. In consequence, the information required for the MorphFilter is available-once the contour point processor 5 has processed about 6 columns.

The contour data preprocessed in this way can be written back to the main memory of the IRTIPS 1, and can then be formatted by the microcontroller and transferred to subsequent processing operations.

FIG. 18 shows the phase and the memory requirement for the processes described above for image processing, as far as segmentation of the image data. The overall memory 60 is split into a memory area 61 for determination of contour points, a memory area 62 which is used by the SNNC 7, a memory area 63 for the morphological filter 11, and a considerably larger memory area 64 for segmentation. As a hardware unit, the SNNC 7 in this case has an associated memory or memory area for determination of links which belong to one contour between contour points, and the size of this memory or memory area is at most 20 percent of the total memory for the processing of the image data for objects which the contours describe, except for the image memory or memories.

As is obvious to a person skilled in the art, the invention is not restricted to the exemplary embodiments described above but in fact can be varied in many ways. In particular, the features of the exemplary embodiments may also be combined with one another.

The invention claimed is:

1. An image processing apparatus comprising:
one or more image memories;
at least one integrated hardware unit, which is designed to scan the data of a digital image stored in the image memory, to determine contour points with subpixel accuracy and to store this as continuous list data in a memory;
a computation unit which is designed to use a computation mechanism to determine from the continuous list data which is stored in the image memory the connection probabilities between in each case two contour points taking into account the distance between the points; and
at least one classifier, which uses sets of calculated probabilities to select subsets with at least three probabilities for possible links between at least three adjacent contour points, one of which is a previously defined central contour point, and to sort out for each subset that contour point which is adjacent to the central contour point and has a possible link with the lowest connection probability to an adjacent contour point, provided that the link does not connect two points which are adjacent to the central point and, following this, enters those contour points which have not been sorted out in a contour point list, with connectors which identify the remaining links to the central point.

2. The image processing apparatus as claimed in claim 1, wherein the at least one classifier is designed to in each case form triples of connection probabilities for the central contour point and two further contour points with associated connection probabilities from the set of the contour points which are adjacent to the central point, to determine the lowest of the connection probabilities and to in each case sort out that contour point which is adjacent to the central point from which the link with the lowest connection probability within the triple originates, from the neighborhood set of the contour points which are adjacent to the central point.

3. The image processing apparatus as claimed in claim 1, comprising a computation device for application of modulation to the connection probabilities, with the modulation corresponding to a position shift of contour points which is less than the pixel interval.

4. The image processing apparatus as claimed in claim 3, wherein the computation mechanism changes pixel coordinates in each case before the calculation of the connection probabilities for application of modulation.

5. The image processing apparatus as claimed in claim 1, wherein the computation unit is designed to calculate at least one further attribute of a contour point in addition to the position of that contour point, and to store this in the continuous list data.

6. The image processing apparatus as claimed in claim 5, wherein the computation unit is designed to produce an attribute vector with a length of at least 24 bits for one contour point, and to store this in the continuous list data.

7. The image processing apparatus as claimed in claim 1, wherein the computation unit is designed to calculate linking probabilities between the contour points on the basis of the distance between the contour points and at least one further attribute.

8. The image processing apparatus as claimed in claim 7, wherein the computation unit is designed to calculate linking probabilities between contour points on the basis of the distance between the contour points and at least one of the attributes selected from the group consisting of contrast, color, and direction.

9. The image processing apparatus as claimed in claim 1, wherein the image processing apparatus is designed for real-time image processing.

10. The image processing apparatus as claimed in claim 1, further comprising dual-port RAM memory and a device for simultaneous storage and reading of the continuous list data from the dual-port RAM memory.

11. The image processing apparatus as claimed in claim 1, further comprising a morphology filter computation device which is designed to filter the contour point list with connectors with respect to at least one characteristics selected from the group consisting of contour points relating to chains of at most three contour points are deleted, contour points which belong only to a chain which is linked to a longer chain at one end and has at most three contour points are deleted, contour points which form start and end points of chains of associated contour points are identified in the contour point list, and contour points which form branching points of at least two chains are identified in the contour point list.

12. The image processing apparatus as claimed in claim 1, further comprising a device for production of ranking vectors for contour points, which device reads the contour point list with a connector structure and in each case reads the connector structure of all adjacent points starting from a central point via the connectors and produces a ranking vector which includes the number of branches of the adjacent points and of the central point itself.

13. The image processing apparatus as claimed in claim 1, wherein the computation unit is designed to in each case determine connection probabilities for a central contour point for possible links between contour points including the central contour point which are a maximum of 2 to 2.5 pixels away from the central point with respect to the raster of the digital image.

14. The image processing apparatus as claimed in claim 1, wherein the at least one classifier is designed to repeat the sort out process for each selected central contour point at least once for the set of contour points which have not been sorted out and are adjacent to the central point.

15. The image processing apparatus as claimed in claim 1, wherein the at least one classifier is designed to repeat the selection process, in which that contour point is in each case sorted out which is adjacent to the central contour point and has a possible link with the lowest connection probability to an adjacent contour point, provided that the link does not connect two points which are adjacent to the central point, for each selected central contour point until no further contour points can be sorted out.

16. The image processing apparatus as claimed in claim 1, further comprising a sorting device which is connected upstream of the computation unit, which sorting device outputs list data of contour points which are adjacent to a selected central contour point, in each case in accordance with a sequence which is maintained during the scanning of an area surrounding the central contour point by reading successive, exclusively adjacent, points in the surrounding area.

17. The image processing apparatus as claimed in claim 1, wherein the computation unit is designed to determine at most one contour point with subpixel accuracy for each contour point in the raster of the image data.

18. The image processing apparatus as claimed in claim 1, with wherein the at least one classifier entering in a contour point list connectors which contain the indexes of adjacent contour points and the connection probabilities to adjacent contour points.

19. The image processing apparatus as claimed in claim 1, further comprising a device for reading the contour point list in an organized sequence as an organized series of contour points, with successive list entries belonging to successive contour points along a contour.

20. A method for determination of associated contours in image data, comprising:
    determining contour points from the image data using at least one integrated hardware unit;
    calculating the connection probabilities of possible links from contour points to adjacent contour points using a computation unit;
    using at least one classifier for:
    analyzing one or more subsets from a set of such connection probabilities and with at least three connection probabilities for possible links between at least two contour points and an adjacent selected central contour point;
    sorting out a contour point in each case which is adjacent to the central contour point and has a possible link with the lowest connection probability to one of the other points, provided that the link does not connect two points which are adjacent to the central point; and, once this analysis of the subsets has been completed; and
    entering contour point data in a list in an electronic memory, with this contour point data comprising connectors which identify links to the central point which belong to one contour.

21. The method as claimed in claim 20, further comprising, in each case, forming triples with the central point and two further contour points with associated connection probabilities from a set of contour points which are adjacent to the central point, determining the lowest of the connection probabilities, and sorting out that contour point which is adjacent to the central point and from which the link with the lowest connection probability within the triple originates from the neighborhood set of the contour points which are adjacent to the central point, provided that the link does not connect two points which are adjacent to the central point.

22. The method as claimed in claim 20, further comprising applying modulation to the connection probabilities, with the modulation corresponding to a position shift of contour points which is less than the pixel interval.

23. The method as claimed in claim 20, further comprising reading the image data in a plurality of strips which each have a width of more than one pixel.

24. The method as claimed in claim 23, wherein the image data is read successively in strips which overlap by more than one pixel.

25. The method as claimed in claim 20, further comprising calculating connection probabilities between contour points on the basis of the distance between the contour points and at least one further attribute.

26. The method as claimed in claim 25, further comprising calculating classifiers for the connection probabilities between contour points on the basis of the distance between the contour points and at least one of the attributes selected from the group consisting of contrast, color, and direction.

27. The method as claimed in claim 26, further comprising calculating the value of a function of the values of one or more attributes, and calculating a connection probability only when the value of the function is greater than or less than a threshold value.

28. The method as claimed in claim 20, wherein the connector structure is scanned with a time delay with respect to the entry of connectors in the contour point list and, during this process, the connector structure of all adjacent points in each case being read starting from a central point over the connectors, and a ranking vector being produced which includes the number of branches of the adjacent points and of the central point itself.

29. The method as claimed in claim 28, further comprising mapping the ranking vector via a table or Boolean functions onto a scalar potential function, and sorting out artifacts being by the scalar potential function.

30. The method as claimed in claim 20, wherein the connection probabilities of contour points are in each case calculated only for those further contour points which are a maximum of 2 to 2.5 pixels away from a contour point with respect to the raster of the digital image.

31. The method as claimed in claim 30, wherein the process of sorting out contour points is repeated until no more contour points which are adjacent to the central contour point can be sorted out.

32. The method as claimed in claim 20, further comprising organizing the list data for a selected central contour point before the calculation of connection probabilities, in each case in accordance with a sequence which is maintained during scanning of an area surrounding the central contour point, by reading successive, exclusively adjacent, points in the surrounding area.

33. The method as claimed in claim 20, wherein at most one contour point is determined with subpixel accuracy for each contour point in the raster of the image data.

34. An integrated image processing apparatus comprising:

one or more image memories;

at least one integrated hardware unit for determination of contour points from image data;

a hardware unit which is connected downstream from the integrated hardware unit for determination of contour points, for determination of links which belong to one contour between contour points;

a morphology processor which is connected downstream from the hardware unit for determination of links, in order to determine the number of links which originate from contour points from contours to adjacent contour points; and a device for segmentation, by means of which objects are created from the data relating to the contour points and their links to further contour points, which objects describe the contours of the image data, with the hardware unit for determination of links which belong to one contour between contour points having an associated memory or memory area whose size is at most 20 percent of the total memory for the processing of the image data to objects which describe the contours, with the exception of the image memory or memories.

* * * * *